Feb. 15, 1938.  B. D. CARTER  2,108,329
TIRE CASING AND RIM
Filed May 10, 1937
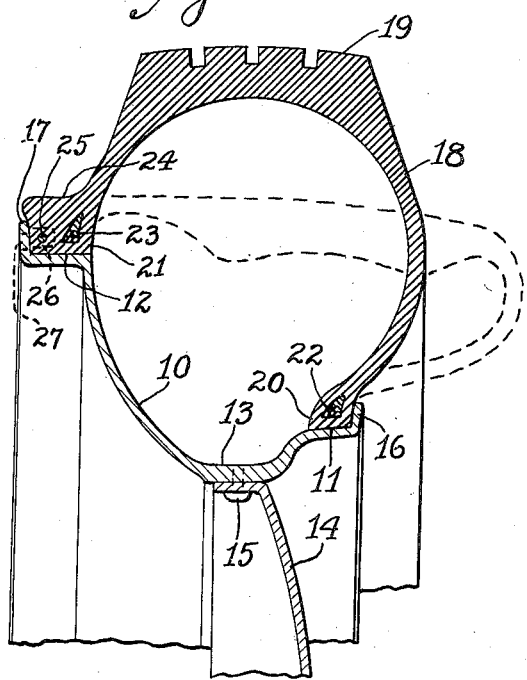
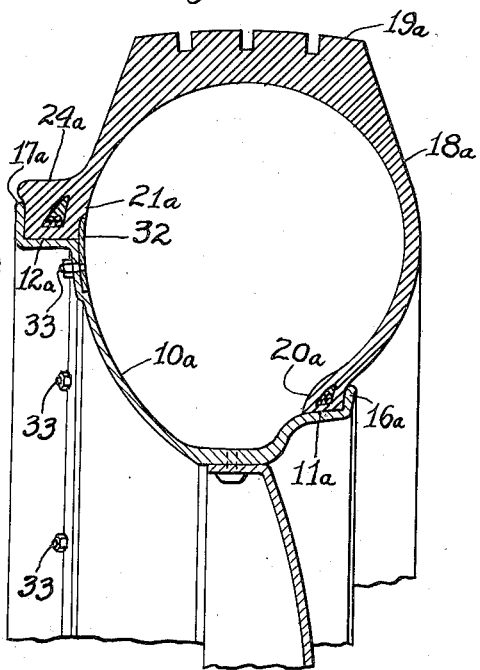
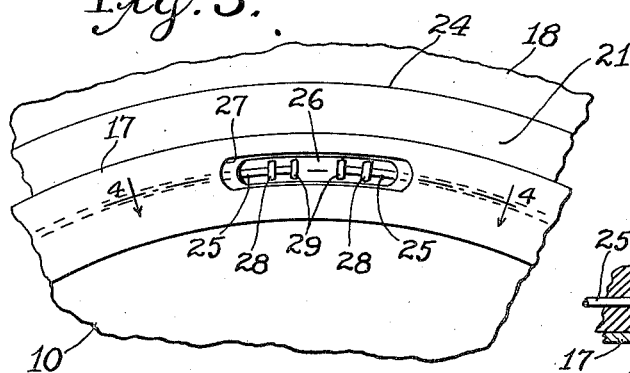
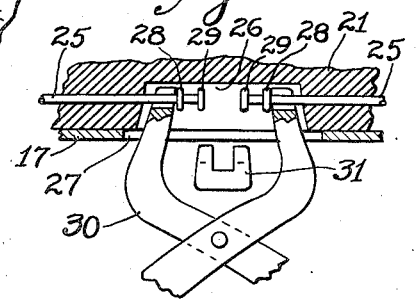
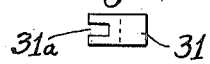
INVENTOR.
BURTON D. CARTER
BY Albert E. Bell
ATTORNEY.

Patented Feb. 15, 1938

2,108,329

UNITED STATES PATENT OFFICE 2,108,329

TIRE CASING AND RIM

Burton D. Carter, Aberdeen, S. Dak.

Application May 10, 1937, Serial No. 141,635

13 Claims. (Cl. 152—20)

My invention pertains to an improved construction of casings for pneumatic tires for use on vehicles, and wheel rims for supporting said casings, by which the advantages below described are secured.

My invention pertains particularly to tire casings of the type known as "straight side" casings and rims of the type known as "drop center" rims, said casings having edge beads containing reinforcing rings of metal which prevent enlargement and stretching of said beads, and said rims having integral edge flanges extending outwardly from the inner diameters of the casing beads to hold the casing laterally on the rim, the drop center of the rim being enough smaller in diameter than the inner diameters of the beads, to permit working the beads over one of the edge flanges of the rim without stretching of the beads, after which the non-stretchable beads are worked onto the casing supporting surfaces of the rim which are of substantially the same diameter as the inner diameters of said beads.

Among the advantages of this type of casing and rim construction, are the stability of the casing beads which makes practically impossible the removal of the casing from the rim when the tire is inflated, and the impossibility of separation of the rim flanges from the rim, on account of the rim and its flanges constituting an integral and unitary structure, which positively holds the casing on the rim for all conditions of use. These advantages are important with the high speed operation of motor vehicles which is now common. At the same time, casings of the type referred to, are usually of large cross-section relatively to the tire diameters, and they are not invulnerable as to punctures and blow-outs, and where for any reason, a tire having a casing of this type, is rapidly deflated when on a vehicle traveling at high speed, the greatly reduced effective diameter of the tire and the relatively large mass of the released and erratically moving deflated casing, constitute a serious menace to those in the vehicle, and an object of the present invention is to overcome these difficulties without sacrificing the advantages of casings and rims of the types referred to.

By my invention, I provide a rim of the "drop center" type, with two laterally spaced cylindrical bead seats, of substantially different diameters, the seat of larger diameter being preferably towards the vehicle on which the wheel rim is used, that is, on the inside portion of the rim, the other and smaller seat being on the outside portion of the rim, and preferably of substantially the same diameter as the inner diameter of the beads of a conventional straight side pneumatic tire casing of the same size. The casing of my invention is provided with edge beads having inner diameters substantially equal respectively to the diameters of the rim seats, and the bead of larger diameter has integrally built into it, an emergency tread construction of somewhat smaller external diameter than the main tread diameter of the casing in use, the difference in these diameters being substantially equal to the normal compression of the main tread of the casing in traveling over roadway inequalities ordinarily encountered, and the diameter of the emergency tread being preferably as much greater than the inner diameter of the smaller bead, as the said normal compression of the main tread will permit.

Among the advantages of my improved construction are

First: In the event of deflation of a tire while in use, due, for example to a blow-out or a puncture, the drop of the wheel from the main tread to the emergency tread of the tire, is so small that the pull on the steering wheel is reduced to a readily controllable amount, thereby greatly reducing the danger of accident;

Second: The greatly reduced wheel drop referred to, materially reduces the tendency of skidding of the deflated tire;

Third: The emergency tread, being of rubber, affords substantial frictional engagement with a roadway when it is brought into use, in contrast to the small frictional engagement of the metal rim with the roadway where the conventional tire and rim construction are used, thereby maintaining the control of the vehicle practically undisturbed in the event of said deflation of the tire;

Fourth: The emergency tread provides a substantial clearance between the smaller flange of the rim and the roadway, thereby not only protecting the larger rim flange from injury in an emergency, by the action of the emergency tread, but also protecting the casing from rim cutting, and preventing injury to the smaller rim flange;

Fifth: The emergency tread being solid and of rubber, provides a surface on which the vehicle may safely be run at slow speed, without injury to the casing or to the rim, thus facilitating reaching a repair station, instead of requiring the vehicle to be stopped at the scene of a tire deflation, attended by the disadvantage and delay involved in bringing a repair man to the scene;

Sixth: The emergency tread protects the casing from rim cutting and the rim from injury due to unusual roadway projections, such as poorly installed car tracks and railway crossings, when in regular use, by cushioning the unusual impacts and preventing their being communicated to the rim flanges through the unduly compressed tire;

Seventh: The emergency tread affords a positive indication of under-inflation of the tire, by the bumping of the relatively stiff but elastic tread over usual roadway projections not felt with a properly inflated tire;

Eighth: In any case of deflation of the tire while in use, and in any case of use of the emergency tread with the tire deflated, and in any case of abnormal and dangerous roadway projections, the substantial difference in diameter of the rim seats, insures a substantial clearance between the smaller rim flange and the roadway, protecting the casing and the inner tube of the tire from injury;

Ninth: The substantial difference in the diameters of the beads of the casing, permits permanently securing the larger bead and associated emergency tread to the larger seat of the rim, without interfering with the removal of the smaller casing bead from the smaller seat of the rim by means of the drop in the center of the rim, when it may be necessary to remove and replace an inner tube, thus materially reducing the time and effort involved in making such repairs, the clearance between the casing and the rim with the smaller bead removed from the rim, being ample to remove and insert an inner tube and any shoes it may be desirable to use, the support of the larger bead tending to hold the main tread of the casing in a position to maintain said clearance during such repairs.

The above and other objects of my invention, will be best understood by reference to the accompanying drawing illustrating a preferred embodiment thereof, in which Fig. 1 illustrates in vertical, transverse, sectional view, a part of a tire casing and cooperating wheel rim in accordance with my invention, Fig. 2 illustrates in a view similar to Fig. 1, a modified means for holding the larger casing bead on the rim, Fig. 3 is a left hand elevation to an enlarged scale, of a portion of the structure shown in Fig. 1, Fig. 4 is a sectional view of a part of the structure shown in Fig. 3, taken along the line 4—4, and Fig. 5 is an end view of the wire retaining device shown in Fig. 4.

Similar numerals refer to similar parts throughout the several views.

As shown in Fig. 1, a metal wheel rim 10, preferably formed from sheet metal, is provided at its edge portions with bead seats 11 and 12 between which the rim is provided with a center drop 13 where the rim is secured to the outer edge portion of the web 14 of the wheel in any suitable manner, for example, by rivets 15. The seats 11 and 12 are provided with outwardly extending edge flanges 16 and 17 for restraining casing beads on said seats, from movement laterally of and away from said seats. The seat 11 is of substantially the same diameter as used with standard drop-center rims for straight-side tire casings of similar diameter and cross-section to the casing illustrating my invention; and the drop center 13 has a relation to said seat 11 similar to that used with said standard rims, so that a non-expansible casing bead of a size to fit said seat 11, may readily be worked over the flange 16, into the center drop 13 and onto the seat 11 against the flange 16 in the usual manner.

The casing 18 is provided with a main tread 19 and edge beads 20 and 21, said beads having incorporated in them reinforcing rings 22 and 23 respectively, made of metal wire in the manner usual in straight-side casing construction, to make the beads rigid against expansion, but permitting the bead 20 to be worked over the rim flange 16 in mounting the casing on the rim. The bead 20 has an inner diameter fitting the seat 11 in a manner usual with straight-side casings and drop-center rims, but the inner diameter of the bead 21 is much larger than the inner diameter of the bead 20, and fits the seat 12 in a manner similar to the fit of the bead 20 on its seat 11. The bead 21 is provided with a substantial enlargement extending laterally from the inner portion of the casing, to form an emergency tread 24, said enlargement being preferably of rubber sufficiently resilient to cushion usual roadway inequalities at slow speeds, and having a depth radially which is sufficient to protect the rim and its flange 17, when the emergency tread is in use. The outer diameter of the emergency tread 24 is enough smaller than the diameter of the main tread 19, so that the compression of the main tread by usual road inequalities when the casing is properly inflated, will not quite bring the emergency tread into engagement with the roadway, and this difference in tread diameters may, of course, be different for different sizes and constructions of casings and the uses for which they are intended.

The seat 12 being of relatively large diameter, I find it desirable to positively hold the bead 21 on said seat, instead of depending on the inflation of the tire to do so. To accomplish this, a heavy wire ring 25 is incorporated in the bead 21 during the manufacture of the casing, the ends of said heavy wire being contained in an outer side recess 26 in the bead, which recess is placed in alinement with a circumferential slot 27 through the flange 17, when the bead 21 is mounted on the seat 12, to give access through said flange to the ends of the ring 25, so that said ring may be tightened in any desired manner, to hold the bead 21 tightly on its seat 12.

In Figs. 3 and 4, I illustrate one means that may be employed to tighten the ring 25. As there shown, the ends of the ring are spaced from each other, and each end has rigidly secured thereto, spaced flanges 28 and 29, so that, as shown in Fig. 4, the outer flanges 28, 28 may be engaged by the slotted jaws of a clamping tool 30, by which the ends of the wire 25 are forced towards each other, until a U-shaped retaining member 31 can be inserted at each of its ends between the flanges 28, 29, and by engagement with the flanges 29, 29, hold the wire 25 in its clamping position pressing the bead 21 tightly against the seat 12, thereby permanently securing the bead 21 on its seat until it is desired to remove the casing, which may be done by first removing the retaining member 31 by means of the tool 30. As shown in Fig. 5, the ends of the retaining member 31 are slotted at 31a to pass around the wire 25 in placing the member in position to hold the flanges 29, 29 as described.

In Fig. 2 I illustrate a modified means for holding the larger bead of the casing on its seat and against the rim flange, consisting of a substantially flat retaining ring 32 of metal having rigidly secured thereto studs 33 extending through clearance holes in the rim, the outer ends of said studs being threaded and engaging suitable nuts by which the ring 32 is securely held in place with its outer portion pressing laterally against the bead of the casing. With this construction, the rim 10a, seats 11a and 12a, rim flanges 16a and 17a, the casing 18a and its beads 20a and 21a, and its treads 19a and 24a, are the same respectively as the rim 10, seats 11 and 12, rim flanges 16 and 17, the casing 18 and its beads 20 and 21, and its treads 19 and 24 above described in connection with Fig. 1, excepting that the wire 25, the recess 26 and the flange slot 27 are omitted, and that the inner surfaces of the rim 10a and casing 18a adjacent the seat 12a, are recessed to receive the thickness of the retaining ring 32, to make the inner surface of the rim 10a and of the casing 18a smoothly continuous with the inner surface of said retaining ring, which ring, it will be understood, may either be a single member, or sectional, as preferred. The ring 32, whether a unitary member or sectional, is readily put in place after the bead 21a is mounted on the seat 12a and before the bead 20a is placed on the rim 10a.

The casings 18 and 18a above described, are made in the usual manner of layers of fabric or cords and rubber, the tread portions 19, 24, 19a and 24a being of rubber compound sufficiently hard and at the same time sufficiently resilient to serve their intended purposes.

In using the rim and casing construction described, inner pneumatic tubes (not shown) are employed in the usual manner to keep the casings in inflated condition.

From the construction described, it will appear that by my invention I attain all of the desirable advantages above set forth, and that with the casing deflated and with the vehicle riding on the emergency tread, the deflated condition of the casing (illustrated in dotted lines in Fig. 1), results in ample clearance spaces in the casing and around the smaller flange of the rim, to completely protect from injury the casing, the inner tube and the smaller flange of the rim, the larger rim flange being at that time also protected against injury by the emergency tread portion of the casing. If preferred, the emergency tread portion may be separate from the casing and mounted on the larger rim seat adjacent the larger casing bead.

While I have shown my invention in the particular embodiment set forth, it will be understood that I do not limit myself thereto in carrying out my invention, as I may employ equivalents thereof without departing from the scope of the appended claims.

What I claim is:

1. In a tire and rim construction, the combination of a rim having two spaced bead seats separated laterally by a drop center, one of said seats having a diameter equal to the inner diameter of the cooperating tire casing, and the other of said seats having a diameter intermediate the inner and outer diameters of said casing, and a straight-side tire casing having edge beads of inner diameters respectively fitting said seats, said larger bead having an enlargement extending laterally outwardly from said casing to constitute an emergency tread.

2. In a tire and rim construction, the combination of a rim having two spaced bead seats separated laterally by a drop center, one of said seats having a diameter equal to the inner diameter of the cooperating tire casing, and the other of said seats having a diameter intermediate the inner and outer diameters of said casing, a straight-side tire casing having edge beads of inner diameters respectively fitting said seats, and an emergency tread portion extending laterally outwardly from said casing and supported on the larger one of said seats, said rim having outwardly extending radial and integral flanges at the outer edges of said seats.

3. In a tire and rim construction, the combination of a rim having two spaced bead seats separated laterally by a drop center, one of said seats having a diameter equal to the inner diameter of the cooperating tire casing, and the other of said seats having a diameter intermediate the inner and outer diameters of said casing, and a straight-side tire casing having edge beads of inner diameters respectively fitting said seats, said larger bead having an enlargement extending laterally outwardly from said casing to constitute an emergency tread, each of said beads having therein a metal restraining ring holding said bead against expansion.

4. In a tire and rim construction, the combination of a rim having two spaced bead seats separated laterally by a drop center, one of said seats having a diameter equal to the inner diameter of the cooperating tire casing, and the other of said seats having a diameter intermediate the inner and outer diameters of said casing, a straight-side tire casing having edge beads of inner diameters respectively fitting said seats, an emergency tread portion on said larger seat adjacent said larger bead, and a metal clamping ring in said emergency tread portion for compressing it against its supporting seat.

5. In a tire and rim construction, the combination of a rim having two spaced bead seats separated laterally by a drop center, one of said seats having a diameter equal to the inner diameter of the cooperating tire casing, and the other of said seats having a diameter intermediate the inner and outer diameters of said casing, and a straight-side tire casing having edge beads of inner diameters respectively fitting said seats, an emergency tread portion on said larger seat adjacent said larger bead, a metal clamping ring in said emergency tread portion for compressing it against its supporting seat, and a retaining member for holding said clamping ring in clamping condition.

6. In a tire and rim construction, the combination of a rim having two spaced bead seats separated laterally by a drop center, one of said seats having a diameter equal to the inner diameter of the cooperating tire casing, and the other of said seats having a diameter intermediate the inner and outer diameters of said casing, and a straight-side tire casing having edge beads of inner diameters respectively fitting said seats, said larger bead having an enlargement extending laterally outwardly from said casing to constitute an emergency tread, a metal clamping ring in said enlargement for compressing said enlargement against the larger one of said seats, and a retaining member for holding said clamping ring in clamping condition, each of said beads having therein a metal restraining ring holding said bead against expansion.

7. In a tire and rim construction, the combination of a rim having two spaced bead seats separated laterally by a drop center, one of said seats having a diameter equal to the inner diameter of the cooperating tire casing, and the other of said seats having a diameter intermediate the inner and outer diameters of said casing, and a straight-side tire casing having edge beads of inner diameters respectively fitting said seats, said larger bead having an enlargement extending laterally outwardly from said casing to constitute an emergency tread, a substantially flat ring in said casing adjacent said larger seat and overlapping said larger bead, and studs extending from said flat ring through said rim for holding said flat ring against said larger bead.

8. In a tire and rim construction, the combination of a rim having two spaced bead seats separated laterally by a drop center, one of said seats having a diameter equal to the inner diameter of the cooperating tire casing, and the other of said seats having a diameter intermediate the inner and outer diameters of said casing, and a straight-side tire casing having edge beads of inner diameters respectively fitting said seats, said larger bead having an enlargement extending laterally outwardly from said casing to constitute an emergency tread, a substantially flat ring in said casing adjacent said larger seat and overlapping said larger bead, and studs extending from said flat ring through said rim for holding said flat ring against said larger bead, each of said beads having therein a metal restraining ring holding said bead against expansion.

9. A casing for pneumatic tires having straight-side edge beads of different inner diameters, the inner diameter of one of said beads being the inner diameter of said casing and the inner diameter of the other of said beads being intermediate the inner and outer diameters of said casing, said larger diameter bead having an enlargement extending laterally therefrom and constituting an emergency tread.

10. A casing for pneumatic tires having straight-side edge beads of different inner diameters, the inner diameter of one of said beads being the inner diameter of said casing and the inner diameter of the other of said beads being intermediate the inner and outer diameters of said casing, said larger diameter bead having an enlargement extending laterally therefrom and constituting an emergency tread, each of said beads having therein a metal restraining ring holding said bead against expansion.

11. A casing for pneumatic tires having straight-side edge beads of different inner diameters, the inner diameter of one of said beads being the inner diameter of said casing and the inner diameter of the other of said beads being intermediate the inner and outer diameters of said casing, said larger diameter bead having an enlargement extending laterally therefrom and constituting an emergency tread, and a metal clamping ring in said enlargement.

12. A casing for pneumatic tires having straight-side edge beads of different inner diameters, the inner diameter of one of said beads being the inner diameter of said casing and the inner diameter of the other of said beads being intermediate the inner and outer diameters of said casing, said larger diameter bead having an enlargement extending laterally therefrom and constituting an emergency tread, a metal clamping ring in said enlargement, and a retaining member for holding said clamping ring in clamping condition.

13. A casing for pneumatic tires having straight-side edge beads of different inner diameters, the inner diameter of one of said beads being the inner diameter of said casing and the inner diameter of the other of said beads being intermediate the inner and outer diameters of said casing, said larger diameter bead having an enlargement extending laterally therefrom and constituting an emergency tread, and a metal clamping ring in said enlargement, each of said beads having therein a metal restraining ring holding said bead against expansion.

BURTON D. CARTER.